US012613153B2

(12) United States Patent
Hong

(10) Patent No.: US 12,613,153 B2
(45) Date of Patent: Apr. 28, 2026

(54) TORQUE DETECTION DEVICE AND TORQUE DETECTION ASSEMBLY

(71) Applicant: Wei-Yin Hong, Kaohsiung (TW)

(72) Inventor: Wei-Yin Hong, Kaohsiung (TW)

( * ) Notice: Subject to any disclaimer, the term of this patent is extended or adjusted under 35 U.S.C. 154(b) by 300 days.

(21) Appl. No.: 18/388,238

(22) Filed: Nov. 9, 2023

(65) Prior Publication Data

US 2025/0155301 A1 May 15, 2025

(51) Int. Cl.
*G01L 3/10* (2006.01)

(52) U.S. Cl.
CPC ...................................... *G01L 3/10* (2013.01)

(58) Field of Classification Search
CPC .......................................................... G01L 3/10
See application file for complete search history.

(56) References Cited

U.S. PATENT DOCUMENTS

| | | | | |
|---|---|---|---|---|
| 5,238,076 A | * | 8/1993 | Aznar | B62D 5/046 |
| | | | | 180/446 |
| 5,585,571 A | * | 12/1996 | Lonsdale | B60C 23/0428 |
| | | | | 73/862.321 |
| 6,144,891 A | * | 11/2000 | Murakami | B23P 19/10 |
| | | | | 81/467 |
| 6,213,846 B1 | * | 4/2001 | Li | B24B 49/16 |
| | | | | 451/6 |
| 6,216,547 B1 | * | 4/2001 | Lehtovaara | G01L 5/10 |
| | | | | 73/862.391 |

| | | | | |
|---|---|---|---|---|
| 6,263,992 B1 | * | 7/2001 | Li | G01L 3/1457 |
| | | | | 73/862.331 |
| 6,725,734 B1 | * | 4/2004 | Toratani | B62D 6/10 |
| | | | | 73/862.08 |
| 6,820,504 B2 | * | 11/2004 | Toratani | B62D 6/10 |
| | | | | 73/862.08 |
| 9,687,972 B2 | * | 6/2017 | Sekino | B25B 21/02 |
| 10,252,402 B2 | * | 4/2019 | Fujisawa | B25B 23/1475 |
| 10,335,931 B2 | * | 7/2019 | Matsumoto | B25B 21/02 |
| 10,358,185 B2 | * | 7/2019 | Gao | G01L 3/104 |
| 10,436,654 B2 | * | 10/2019 | Su | G01L 5/162 |
| 10,450,863 B2 | * | 10/2019 | Jacobs | F01D 5/02 |
| 2009/0179385 A1 | * | 7/2009 | Komino | F16J 15/43 |
| | | | | 277/410 |
| 2010/0122688 A1 | * | 5/2010 | Sihler | F02D 41/1497 |
| | | | | 123/350 |

(Continued)

*Primary Examiner* — Freddie Kirkland, III
(74) *Attorney, Agent, or Firm* — Birch Stewart Kolasch & Birch, LLP

(57) ABSTRACT

A torque detection assembly includes a shaft and a torque detection device. The torque detection device includes at least one conductive ring and an internal device, wherein the at least one conductive ring is disposed at the shaft and receives a first power in a sliding contact manner. The internal device is disposed at the shaft and includes a torque sensing module, an internal voltage regulating circuit, and an internal control module. The torque sensing module senses a torque of the shaft and generates a corresponding electrical signal. The internal control module determines the torque sensed by the torque sensing module based on the electrical signal and controls the internal voltage regulating circuit to change a voltage of the first power on the at least one conductive ring based on the torque sensed by the torque sensing module to form a first varied voltage signal.

12 Claims, 6 Drawing Sheets

(56)         References Cited

U.S. PATENT DOCUMENTS

| | | | |
|---|---|---|---|
| 2014/0102219 A1* | 4/2014 | Kuwahara | B62D 5/0481 |
| | | | 73/862.333 |
| 2018/0188123 A1* | 7/2018 | Su | G01L 5/162 |
| 2021/0100579 A1* | 4/2021 | Shelton, IV | H01M 6/02 |
| 2022/0299388 A1* | 9/2022 | Kang | B62J 45/411 |

* cited by examiner

TORQUE DETECTION DEVICE AND TORQUE DETECTION ASSEMBLY

BACKGROUND OF THE INVENTION

Technical Field

The present invention relates generally to torque detection of a shaft, and more particularly to a torque detection device and a torque detection assembly.

Description of Related Art

Shafts are commonly used in various devices, such as electric tools, impact tools, bicycles and machining centers. Due to the continuous rotation of a shaft, when it is necessary to measure torque of the shaft, an indirect torque detection device coupled to the shaft is typically used to measure the torque of the shaft indirectly. Since the torque of the shaft is measured indirectly, it cannot provide precise results of torque measurements.

To precisely measure the torque of the shaft, a known method is to mount a torque sensor on the shaft, wherein the torque sensor is electrically connected to a wireless transmission device; the wireless transmission device transmits the torque sensed by the torque sensor to an external system through a corresponding wireless signal. However, the wireless transmission device could be costly. Additionally, in certain environments, wireless signals may be affected by other devices or electromagnetic interference, leading to unstable or interrupted communication.

Therefore, the conventional torque measurement method of the shaft still has room for improvement.

BRIEF SUMMARY OF THE INVENTION

In view of the above, the primary objective of the present invention is to provide a torque detection device and a torque detection assembly, which could measure the torque of the shaft directly and convert the torque sensed to a corresponding varied voltage signal.

The present invention provides a torque detection device for detecting a torque of a shaft. The torque detection device includes at least one conductive ring and an internal device, wherein the at least one conductive ring is disposed at the shaft and receives a first power in a sliding contact manner. The internal device is disposed at the shaft and includes a torque sensing module, an internal voltage regulating circuit, and an internal control module. The torque sensing module senses the torque of the shaft and generates a corresponding electrical signal. The internal voltage regulating circuit is electrically connected to the at least one conductive ring. The internal voltage regulating circuit is controllable to change a voltage of the first power on the at least one conductive ring. The internal control module is electrically connected to the torque sensing module and the internal voltage regulating circuit. The internal control module determines the torque sensed by the torque sensing module based on the electrical signal. The internal control module controls the internal voltage regulating circuit to change the voltage of the first power on the at least one conductive ring based on the torque sensed by the torque sensing module to form a first varied voltage signal. Wherein the first varied voltage signal varies to be a first voltage or a second voltage, wherein the second voltage is less than the first voltage.

The present invention provides a torque detection assembly including a shaft and a torque detection device. The torque detection device includes at least one conductive ring and an internal device. The at least one conductive ring is disposed at the shaft. The at least one conductive ring receives a first power in a sliding contact manner. The internal device is disposed at the shaft and includes a torque sensing module, an internal voltage regulating circuit, and an internal control module. The torque sensing module senses the torque of the shaft and generates a corresponding electrical signal. The internal voltage regulating circuit is electrically connected to the at least one conductive ring. The internal voltage regulating circuit is controllable to change a voltage of the first power on the at least one conductive ring. The internal control module is electrically connected to the torque sensing module and the internal voltage regulating circuit. The internal control module determines the torque sensed by the torque sensing module based on the electrical signal. The internal control module controls the internal voltage regulating circuit to change the voltage of the first power on the at least one conductive ring based on the torque sensed by the torque sensing module to form a first varied voltage signal. The first varied voltage signal varies to be a first voltage or a second voltage, wherein the second voltage is less than the first voltage.

With the aforementioned design, the internal control module could control the internal voltage regulating circuit to change the voltage on the conductive ring based on the torque sensed by the torque sensing module to form the first varied voltage signal corresponding to the torque. By externally measuring the voltage variation of the conductive ring, the first varied voltage signal corresponding to the torque could be acquired, thereby further resolving the first varied voltage signal to acquire the torque sensed by the torque sensing module.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
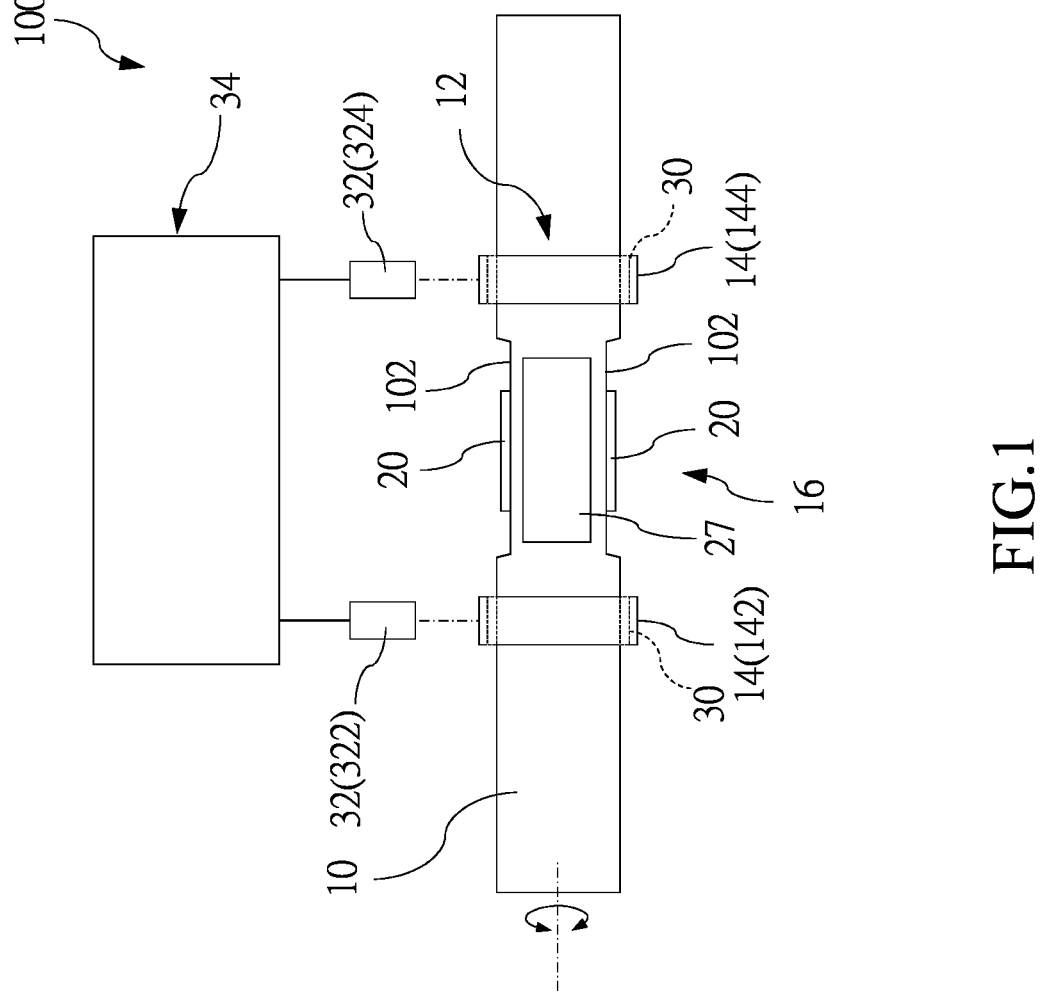
FIG. 1 is a schematic view of the torque detection assembly according to a first embodiment of the present invention.
Figure 2:
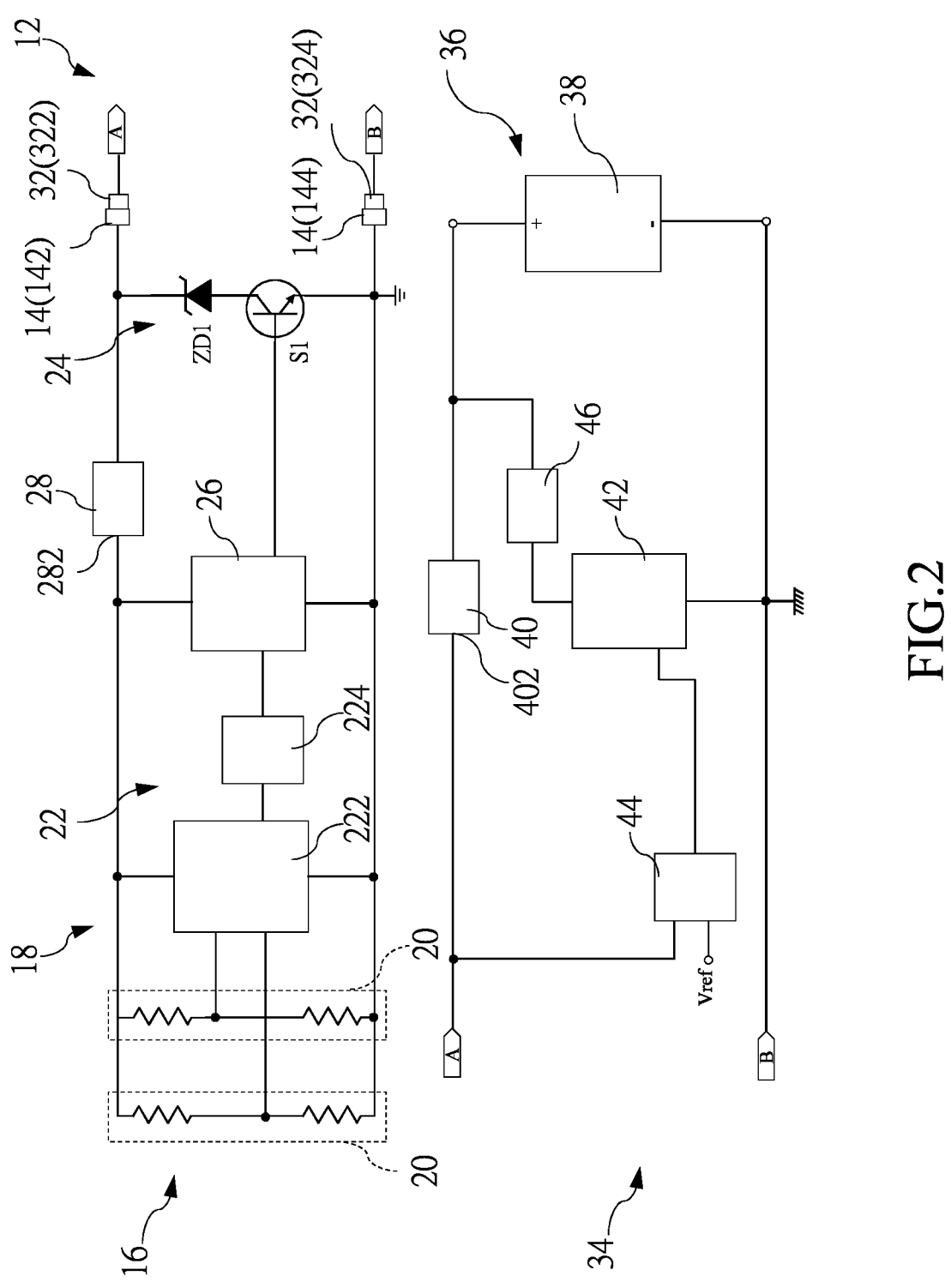
FIG. 2 is a circuit diagram of the torque detection device according to the first embodiment of the present invention.

A torque detection assembly 100 according to a first embodiment of the present invention is shown in FIG. 1 and FIG. 2 and includes a shaft 10 and a torque detection device 12 of the current embodiment.

In the current embodiment, the shaft 10 is a rotatable shaft. For example, the shaft 10 could be a driving shaft of an electric tool, a driving shaft of an impact tool, a bottom bracket (BB) of a bicycle, or a spindle of a machining center. The shaft 10 is made of metal in the current embodiment, but not limited thereto. The shaft 10 has two cutting grooves 102 respectively located at two opposite sides of the shaft 10 in a radial direction of the shaft 10.

The torque detection device 12 is configured to detect torque generated by the shaft 10 to correspondingly output a varied voltage signal (that is, a first varied voltage signal).

The torque detection device 12 includes at least one conductive ring 14 and an internal device 16. The at least one conductive ring 14 is disposed at the shaft 10; the at least one conductive ring 14 receives a first power in a sliding contact manner; the first power has a first voltage V1 under a normal condition; the first voltage V1 could be, for example, 10 V, but not limited thereto; the first voltage V1 could be a voltage ranging from 10 V to 15 V. In the current embodiment, the at least one conductive ring 14 is a metal ring, such as a copper ring. In the current embodiment, the at least one conductive ring 14 includes two conductive rings 142, 144 sleeved on the shaft 10 and surrounding around an outer peripheral face of the shaft 10. The two cutting grooves 102 are located between the two conductive rings 142, 144 in an axial direction of the shaft 10. Two insulating sleeves 30 are provided between each of the two conductive rings 142, 144 and the shaft 10; each of the two insulating sleeves 30 is located between each of the two conductive rings 142, 144 and the outer peripheral face of the shaft 10, so that each of the two conductive rings 142, 144 and the shaft 10 could be electrically isolated. When the shaft 10 rotates, the two conductive rings 142, 144 rotate with the shaft 10. The two conductive rings 142, 144 receive the first power in a sliding contact manner, wherein one of the conductive rings 142 is a positive terminal while the other conductive ring 144 is a ground terminal. In one embodiment, the at least one conductive ring could be one conductive ring 142; the conductive ring 142 is a positive terminal while the shaft 10, which is made of metal, could be grounded.

The internal device 16 is disposed at the shaft 10 and rotates with the shaft 10; the internal device 16 includes a torque sensing module 18, an internal voltage regulating circuit 24, and an internal control module 26. The torque sensing module 18 is disposed at the shaft 10; the torque sensing module 18 senses the torque of the shaft 10 and generates a corresponding electrical signal. The torque sensing module 18 includes at least one strain gauge 20 configured to sense the torque of the shaft 10 in at least one direction of rotation. The torque sensing module 18 further includes a readout circuit 22 configured to convert a sensing signal of the at least one strain gauge 20 to the electrical signal. In the current embodiment, two strain gauges 20 are used, wherein the two strain gauges 20 are respectively fixed in the two cutting grooves of the shaft 10 to sense the torque of the shaft 10 in two opposite directions of rotation. The internal device 16 further includes a circuit board 27 disposed at the shaft 10 and located between the two cutting grooves 102. The readout circuit 22 is disposed at the circuit board 27. The readout circuit 22 includes a differential circuit 222. Two input terminals of the differential circuit 222 are electrically connected to the two strain gauges 20 respectively; an output terminal of the differential circuit 222 outputs the electrical signal, which is an analog signal. Optionally, the readout circuit 22 could include an amplifier circuit 224; the amplifier circuit 224 amplifies a voltage output by the differential circuit 222 to form the electrical signal.

For instance, when the shaft 10 does not generate torque (that is 0 N-m), a voltage of the electrical signal is 2.5 V; when the shaft 10 generates torque in a forward direction, the voltage of the electrical signal increases from 2.5 V; the more the torque, the higher the voltage; the upper limit of the voltage of the electrical signal could be, for example, 5 V; conversely, when the shaft 10 generates torque in a reverse direction, the voltage of the electrical signal decreases from 2.5 V; the more the torque, the lower the voltage. The lower limit of the voltage of the electrical signal could be, for example, 0 V. Alternatively, when the shaft 10 does not generate torque, the voltage of the electrical signal is 1.65 V; the upper limit of the voltage of the electrical signal could be, for example, 3.3 V and the lower limit of the voltage of the electrical signal could be, for example, 0 V.

The internal voltage regulating circuit 24 and the internal control module 26 are disposed at the circuit board 27. The internal voltage regulating circuit 24 is electrically connected to the at least one conductive ring 14; the internal voltage regulating circuit 24 is controllable to change a voltage of the first power on the at least one conductive ring 14. The internal voltage regulating circuit 24 includes a Zener diode ZD1 and a switch element S1 connected in series. In the current embodiment, the Zener diode ZD1 and the switch element S1 are sequentially connected in series between the two conductive rings 142, 144; a cathode of the Zener diode ZD1 is connected to one of the conductive rings 142; an anode of the Zener diode ZD1 is connected to a first terminal of the switch element S1; a second terminal of the switch element S1 is connected to the other conductive ring 144; a third terminal of the switch element S1 is controllable to be turned on or cut off between the first terminal and the second terminal. In the current embodiment, the switch element S1 is a bipolar junction transistor (BJT), but not limited thereto; the switch element S1 could also be a metal-oxide-semiconductor field-effect transistor (MOS-FET). When the switch element S1 is cut off, the first power has the first voltage V1, that is, a voltage between the two conductive rings 142, 144 is maintained at the first voltage V1; when the switch element S1 is turned on, the Zener diode ZD1 exhibits reverse breakdown, so that the first power has a second voltage V2, that is, the voltage between the two conductive rings 142, 144 is the second voltage V2, which is a breakdown voltage of the Zener diode ZD1. The second voltage V2 is less than the first voltage V1; for example, the second voltage V2 is 7 V, but not limited thereto.

The internal control module 26 is electrically connected to the torque sensing module 18 and the internal voltage regulating circuit 24. In the current embodiment, the internal control module 26 could be, for example, a microcontroller; the internal control module 26 is electrically connected to the readout circuit 22 of the torque sensing module 18 and the third terminal of the switch element S1 of the internal voltage regulating circuit 24. The internal control module 26 could have a built-in analog/digital converter to convert the electrical signal, which is an analog signal, to a corresponding digital value. The internal control module 26 determines the torque sensed by the torque sensing module 18 based on the electrical signal; the internal control module 26 controls the internal voltage regulating circuit 24 to change the voltage of the first power on the at least one conductive ring 14 based on the torque sensed by the torque sensing module 18 to form the first varied voltage signal; the voltage of the first varied voltage signal varies to be the first voltage V1 or a second voltage V2. In other words, the first varied voltage signal corresponds to the torque sensed by the torque sensing module 18.

In the current embodiment, the first varied voltage signal is a pulse width modulation signal; the internal control module 26 outputs a corresponding control signal to the switch element S1 based on a value of the torque to generate the first varied voltage signal. The control signal is also a pulse width modulation signal. Preferably, a frequency of the control signal and that of the first varied voltage signal are a predetermined frequency ranging from 200 Hz to 300 Hz. In the current embodiment, the predetermined frequency is 250 Hz, that is, a period T of the control signal and that of the first varied voltage signal are 4 ms. A purpose of setting the predetermined frequency is that when a bounce occurs between conductive members 322, 324 and the conductive rings 142, 144, the first varied voltage signal could be distinguished from an unexpected varied voltage occurring during bouncing.

Figure 3:
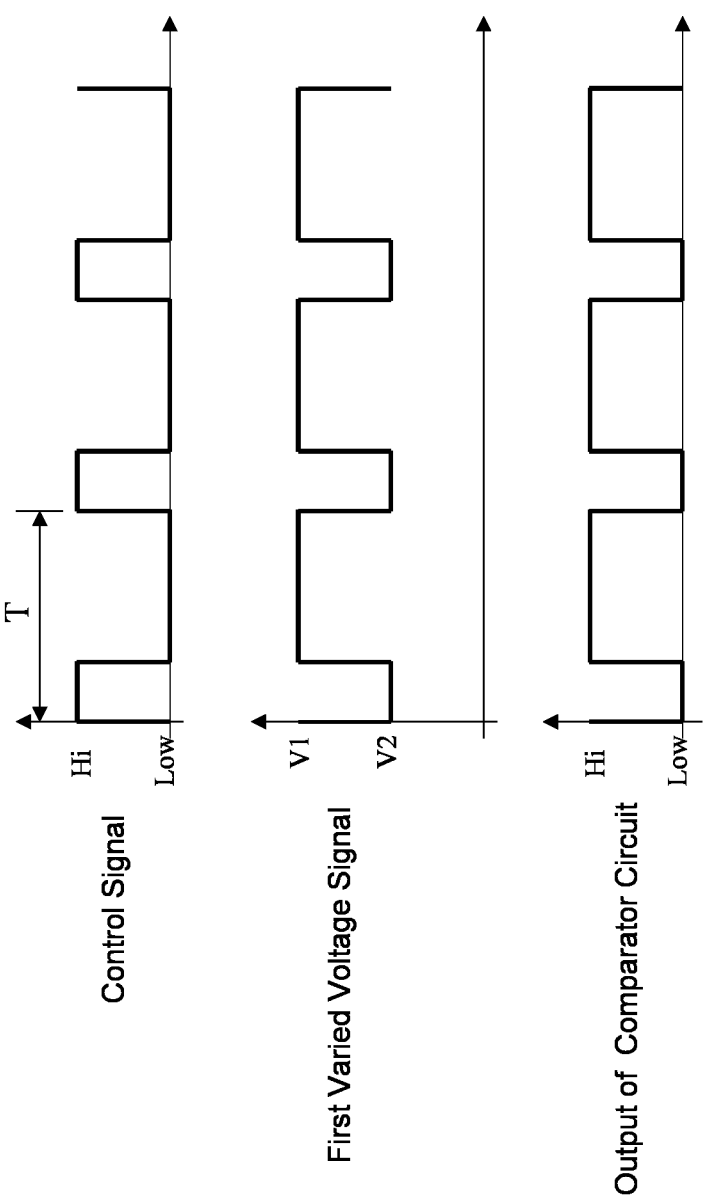
FIG. 3 is a schematic view of the voltage waveforms according to the first embodiment of the present invention.

For instance, referring to FIG. 3, the period T of the control signal and that of the first varied voltage signal is 4 ms as an example. When the control signal is turned to a high-level voltage Hi, the value of the torque begins to be transmitted, wherein a pulse width of the high-level voltage Hi represents the value of the torque. Taking 50% of a duty cycle as 0 N-m as an example, when the shaft 10 rotates in the forward direction and generates torque, the duty cycle increases from 50% to a first predetermined duty cycle; when the shaft 10 rotates in the reverse direction and generates torque, the duty cycle decreases from 50% to a second predetermined duty cycle. The duty cycle could be adjusted to represent the value of the torque. Relatively, the first varied voltage signal corresponds to the control signal; a width of the second voltage V2 in the first varied voltage signal corresponds to the pulse width of the high-level voltage Hi in the control signal; in other words, the first varied voltage signal is an inverted pulse width modulation signal of the control signal; a proportion of the width of the second voltage V2 to the period T is equivalent to the duty cycle of the control signal. In this way, a voltage waveform between the two conductive rings 142, 144 could be externally measured, so that the first varied voltage signal could be used to determine the torque sensed by the torque sensing module 18. In one embodiment, a proportion of a width of the low-level voltage Low to the period T could be used to represent the value of the torque; by detecting a proportion of the width of the first voltage V1 to the period T in the first varied voltage signal, the torque sensed by the torque sensing module 18 could be determined.

In this way, the internal device 16 could transmit the torque sensed by the torque sensing module 18 to the outside through one conductive ring 142 or two conductive rings 142, 144, so that the at least one conductive ring 14 could be used in communication. By externally measuring the voltage variation of the at least one conductive ring 14, the first varied voltage signal corresponding to the torque could be acquired, thereby further resolving the first varied voltage signal to acquire the torque sensed by the torque sensing module 18.

As aforementioned, the control signal and the first varied voltage signal are the pulse width modulation signals as an example, but not limited thereto; the control signal and the first varied voltage signal could also be serial signals, such as Universal Asynchronous Receiver/Transmitter (UART) signal; the internal control module 26 encodes the value of the torque sensed and transmits the value of the torque encoded via serial communication, so that the control signal and the first varied voltage signal form serial signals.

Additionally, in the current embodiment, the internal device 16 further includes a power conversion module 28 disposed at the circuit board 27 and electrically connected to the conductive ring 142. The power conversion module 28 has a power output port 282 electrically connected to the torque sensing module 18 and the internal control module 26; the power conversion module 28 converts the first power to a second power with a working voltage and outputs the second power from the power output port 282 to the torque sensing module 18 and the internal control module 26. The working voltage is less than the second voltage V2 of the first varied voltage signal. The working voltage could be, for example, 5 V, but not limited thereto; the working voltage could also be 3.3 V.

The power conversion module 28 could include a voltage regulator, such as a low dropout linear regulator; the power conversion module 28 could steadily provide the working voltage to the strain gauge 20 and the readout circuit 22 of the torque sensing module 18, and to the internal control module 26. Since both the first voltage and the second voltage of the first varied voltage signal are greater than the working voltage, the working voltage is unaffected by the voltage variation of the first varied voltage signal. In this way, the one conductive ring 142 or the two conductive rings 142, 144 could simultaneously serve the purposes of transmitting power and communication, without the need for additional conductive rings. In one embodiment, the shaft 10 could be provided with an internal battery (not shown); the internal battery is configured to supply power to the power conversion module 28 to generate the second power.

Additionally, in the current embodiment, the torque detection device 12 further includes at least one conductive member 32 and an external device 34. The at least one conductive member 32 is in sliding contact with the at least one conductive ring 14. In the current embodiment, the at least one conductive member 32 includes two conductive members 322, 324 respectively in contact with the two conductive rings 142, 144. Each of the conductive members 322, 324 could be, for example, a graphite brush or a metal piece; when the conductive rings 142, 144 rotate with the shaft 10, the conductive members 322, 324 are in sliding contact with the conductive rings 142, 144. The external device 34 is located outside the shaft 10, that is, the external device 34 is not connected to the shaft 10 and does not rotate with the shaft 10.

The external device 34 includes a power supply module 36 and an external control module 42; the power supply module 36 is electrically connected to the two conductive members 322, 324 and supplies the first power to the two conductive members 322, 324. The first power is conducted to the conductive rings 142, 144 through the conductive members 322, 324. A voltage of the first power supplied by the power supply module 36 is the first voltage.

In the current embodiment, the power supply module 36 includes a power source 38 and a power conversion module 40. The power source 38 could be, for example, a power supply or a battery configured to supply DC power; a voltage of the DC power is higher than the first voltage V1; for example, the voltage of the DC power could be 20 V to 48 V. The power conversion module 40 could include a voltage regulator; the power conversion module 40 is electrically connected to the power source 38 and converts power of the power source 38 to the first power. A power output port 402 of the power conversion module 40 is electrically connected to the conductive member 322; for example, the power output port 402 could be directly electrically connected or be electrically connected through a current limiting resistor (not shown) to the conductive member 322.

The external control module 42 is electrically connected to the at least one conductive member 32; the external control module 42 resolves the first varied voltage signal to acquire the torque sensed by the torque sensing module 18. The external control module 42 could be, for example, a microcontroller; the external control module 42 determines the voltage variation of the conductive members 322, 324 to resolve the first varied voltage signal. In the current embodiment, the external device 34 includes a comparator circuit 44; the external control module 42 is electrically connected to the conductive member 322 through the comparator circuit 44, that is, the comparator circuit 44 is electrically connected between the conductive member 322 and the external control module 42; the comparator circuit 44 could be, for example, a comparator based on an operational amplifier. In addition, the power supply module 36 could further include another power conversion module 46 to convert the power of the power source 38 to the working voltage required by the external control module 42 and/or the comparator circuit 44.

The comparator circuit 44 has two input terminals and an output terminal, wherein one of the input terminals of the comparator circuit 44 is connected to the conductive member 322; the other input terminal of the comparator circuit 44 is for inputting a reference voltage Vref; the reference voltage Vref could be, for example, 8.5 V. The output terminal of the comparator circuit 44 is electrically connected to the external control module 42. The comparator circuit 44 respectively converts the first voltage and the second voltage to a digital high-level voltage Hi (such as 5 V or 3.3 V) and a digital low-level voltage Low (such as 0 V) suitable for the external control module 42. As shown in FIG. 3, when a voltage of the conductive member 322 is the first voltage V1, the comparator circuit 44 outputs the digital high-level voltage Hi; when the voltage of the conductive member 322 is the second voltage V2, the comparator circuit 44 outputs the digital low-level voltage Low. In other words, the output voltage variation of the comparator circuit 44 corresponds to the voltage variation of the first varied voltage signal; the external control module 42 could resolve the first varied voltage signal through the output voltage variation of the comparator circuit 44 and therefore determine the torque sensed by the torque sensing module 18. Since the first varied voltage signal is converted into a digital voltage level and then is inputted to the external control module 42, the external control module 42 could process the first varied voltage signal digitized much faster. Preferably, the external control module 42 uses an interrupt to process the output of the comparator circuit 44 to improve the processing speed.

Alternatively, the external control module 42 could have a built-in analog/digital converter and is electrically connected to the at least one conductive member 32 through a voltage divider (as the voltage divider 60 shown in FIG. 5); the voltage divider divides the first voltage or the second voltage into a corresponding divided voltage and inputs the divided voltage to the analog/digital converter of the external control module 42 to convert the divided voltage, which is an analog voltage, to a corresponding digital value; in this way, the external control module 42 could also resolve the first varied voltage signal and therefore determine the torque sensed by the torque sensing module 18.

In the current embodiment, to eliminate the unexpected voltage variation caused by the bounce between the conductive members 322, 324 and the conductive rings 142, 144, the external control module 42 further determines the frequency of the first varied voltage signal; when the frequency of the first varied voltage signal matches the predetermined frequency, the external control module 42 resolves the first varied voltage signal to acquire the torque sensed by the torque sensing module 18. In this way, a situation that the external control module 42 misinterprets the first varied voltage signal due to the bounce between the conductive members 322, 324 and the conductive rings 142, 144 could be prevented.

In the first embodiment, the internal device 16 is used to transmit the torque sensed by the torque sensing module 18 to the outside, that is, one-way transmission; other embodiments of two-way transmission occurring between the internal device 16 and the external device 34 will be described as below.

Figure 4:
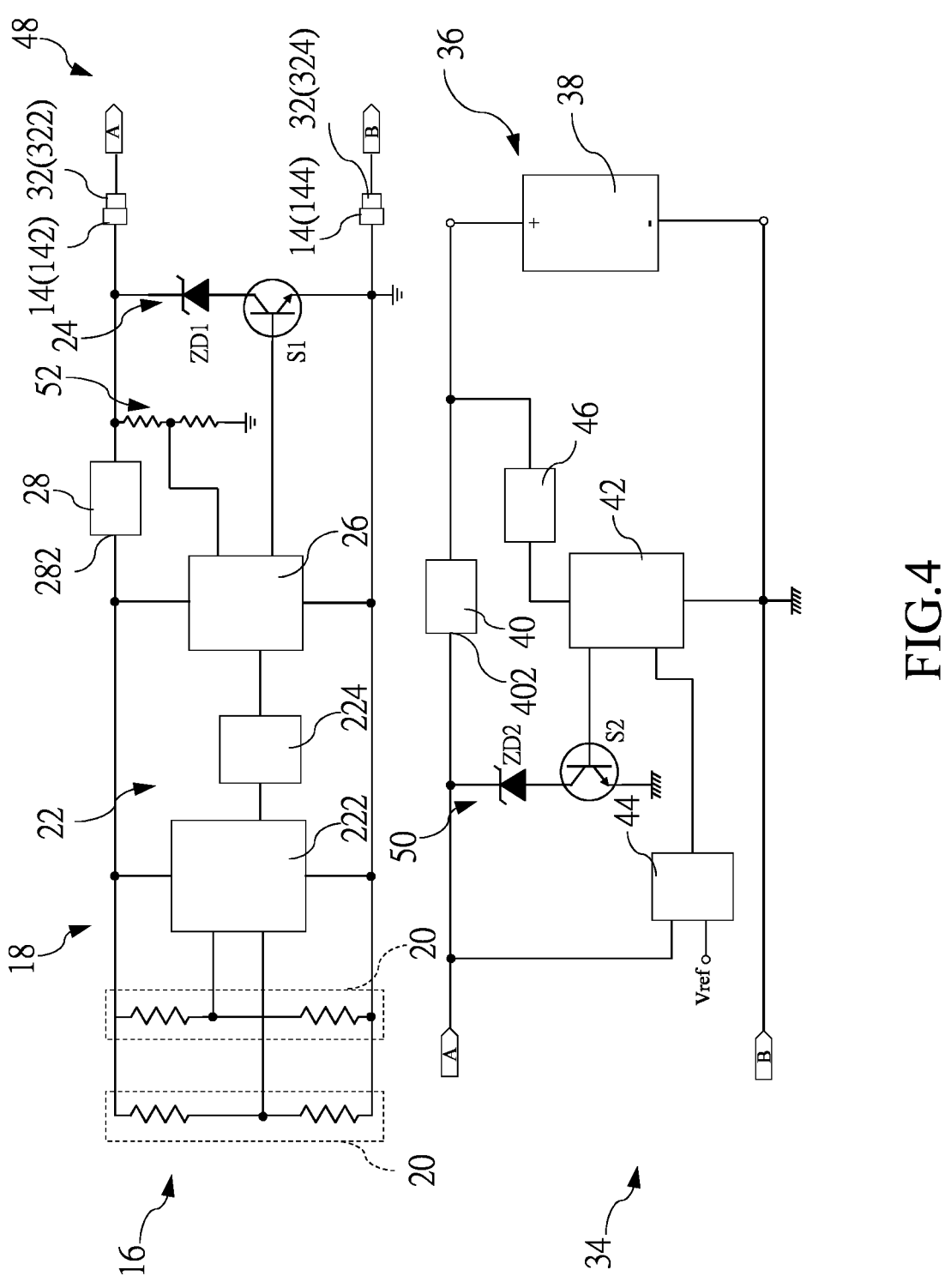
FIG. 4 is a circuit diagram of the torque detection device according to a second embodiment of the present invention.

A torque detection device 48 of a torque detection assembly according to a second embodiment of the present invention is shown in FIG. 4, wherein a structure of the torque detection device 48 is based on that of the first embodiment; the external device 34 of the second embodiment further includes an external voltage regulating circuit 50 electrically connected to the at least one conductive member 32 and the external control module 42; the external voltage regulating circuit 50 is controllable to change the voltage of the first power on the at least one conductive ring 14. The external control module 42 controls the external voltage regulating circuit 50 to change the voltage of the first power on the at least one conductive ring 14 based on a control command to form a second varied voltage signal; the second varied voltage signal varies to be the first voltage or a third voltage, wherein the third voltage is less than the first voltage.

In the current embodiment, the external voltage regulating circuit 50 includes a Zener diode ZD2 and a switch element S2 connected in series; the Zener diode ZD2 and the switch element S2 are sequentially connected in series between the two conductive members 322, 324; the switch element S2 is BJT, but not limited thereto; the switch element S2 could be MOSFET. A structure of the external voltage regulating circuit 50 and that of the internal voltage regulating circuit 24 of the second embodiment are almost the same as that of the first embodiment, so that the interconnection relationship thereof will not be further elaborated.

The switch element S2 is electrically connected to the external control module 42 and is controllable to be turned on or cut off by the external control module 42; when the switch element S2 is cut off, the first power has the first voltage; when the switch element S2 is turned on, the Zener diode ZD2 exhibits reverse breakdown, so that the first power has the third voltage, that is, the voltage between the two conductive members 142, 144 is the third voltage, which is a breakdown voltage of the Zener diode ZD2. The third voltage is less than the first voltage; the third voltage could be equal to the second voltage; for example, the third voltage could be 7 V; the third voltage could be different from the second voltage and is greater than the working voltage of the second power.

For instance, the protocol between the external control module 42 and the internal control module 26 could be defined by default; for example, the control command could specify a predetermined torque; when the torque sensed by the torque sensing module 18 reaches the predetermined torque, the internal control module 26 generates the first varied voltage signal to correspond to the torque sensed by the torque sensing module 18. The internal control module 26 does not generate the first varied voltage signal until the torque sensed by the torque sensing module 18 reaches the predetermined torque.

In the current embodiment, the second varied voltage signal is a pulse width modulation signal; the external control module 42 outputs a corresponding control signal to the switch element S2 based on a value of the predetermined torque to generate the second varied voltage signal. The control signal output by the external control module 42 is also a pulse width modulation signal. Preferably, a frequency of the control signal output by the external control module 42 and that of the second varied voltage signal are a predetermined frequency ranging from 200 Hz to 300 Hz. In the current embodiment, the predetermined frequency is 250 Hz, that is, a period of the control signal output by the external control module 42 and that of the second varied voltage signal are 4 ms. A purpose of setting the predetermined frequency is that when a bounce occurs between conductive members 322, 324 and the conductive rings 142, 144, the second varied voltage signal could be distinguished from an unexpected varied voltage occurring during bouncing.

For example, when the control signal output by the external control module 42 is turned to a high-level voltage, the value of the predetermined torque begins to be transmitted, wherein a pulse width of the high-level voltage represents the value of the predetermined torque, but not limited thereto; a pulse width of a low-level voltage could be used to represent the value of the predetermined torque; a relationship between the value of the predetermined torque and the duty cycle of the pulse width modulation signal is the same as the relationship described in FIG. 3 of the first embodiment, and will not be further elaborated herein. In one embodiment, the control signal output by the external control module 42 and the second varied voltage signal could also be serial signals.

The internal control module 26 is electrically connected to the at least one conductive ring 14 and resolves the second varied voltage signal to acquire the control command. In the current embodiment, the internal device 16 includes a voltage divider 52 electrically connected to the at least one conductive ring 14 and the internal control module 26; the voltage divider 52 is composed of two resistors. The voltage divider 52 divides the first voltage or the third voltage into a corresponding divided voltage and inputs the divided voltage to an analog/digital converter of the internal control module 26 to convert the voltage of the second varied voltage signal to a corresponding digital value. The internal control module 26 resolves the second varied voltage signal and therefore determines the predetermined torque specified by the control command.

Alternatively, a comparator circuit that is the same as comparator circuit 44 of the first embodiment could be used to replace the voltage divider 52, which could generate variations of a digital voltage level corresponding to the second varied voltage signal.

In the current embodiment, to eliminate the unexpected voltage variation caused by the bounce between the conductive members 322, 324 and the conductive rings 142, 144, the internal control module 26 further determines the frequency of the second varied voltage signal; when the frequency of the second varied voltage signal matches the predetermined frequency, the internal control module 26 resolves the second varied voltage signal to acquire the control command.

In this way, the internal control module 26 could continuously acquire the torque sensed by the torque sensing module 18; when the torque sensed by the torque sensing module 18 reaches the predetermined torque, the internal control module 26 controls the internal voltage regulating circuit 24 to generate the first varied voltage signal; the external control module 42 could resolve the first varied voltage signal to determine whether the torque sensed by the torque sensing module 18 reaches the predetermined torque. When the present invention is applied to an electric tool, the external control module 42 could provide corresponding control feedback to a motor of the electric tool.

Figure 5:
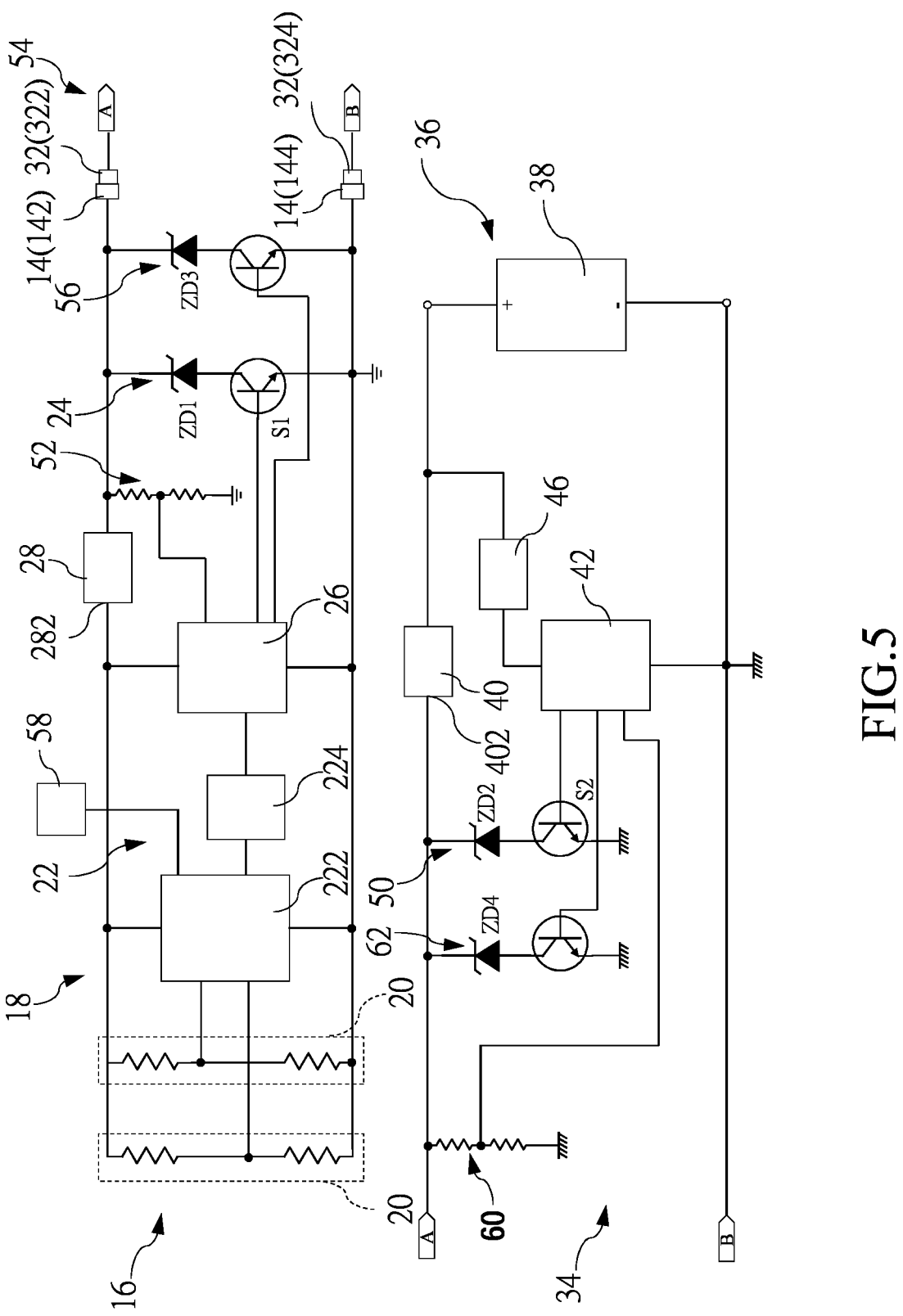
FIG. 5 is a circuit diagram of the torque detection device according to a third embodiment of the present invention.

A torque detection device 54 of the torque detection assembly according to a third embodiment of the present invention is shown in FIG. 5, wherein a structure of the torque detection device 54 is based on that of the second embodiment, except that the internal device 16 of the third embodiment further includes at least another internal voltage regulating circuit 56; the internal control module 26 outputs a control signal to the another internal voltage regulating circuit 56 based on a sensing electrical signal to generate a third varied voltage signal; a voltage of the third varied voltage signal varies to be the first voltage or a fourth voltage, wherein the fourth voltage is a breakdown voltage of a Zener diode ZD3 of the another internal voltage regulating circuit 56; the fourth voltage is not equal to the second voltage and the third voltage and is greater than the working voltage; the sensing electrical signal could be an electrical signal corresponding to the torque sensed by the torque sensing module 18. Alternatively, the internal device 16 could further include a sensor 58 configured to sense a physical quantity of the shaft 10; for example, the sensor 58 could be a temperature sensor, wherein the physical quantity is the temperature.

The external control module 42 is electrically connected to the conductive member 322 through a voltage divider 60; the external control module 42 acquires the voltage on the conductive member 322 through the voltage divider 60 to determine whether the voltage corresponds to the first varied voltage signal or the third varied voltage signal.

In addition, the external device 34 further includes at least another external voltage regulating circuit 62. The external control module 42 could output a control signal to the another external voltage regulating circuit 62 based on another control command to generate a fourth varied voltage signal; a voltage of the fourth varied voltage signal varies to be the first voltage or a fifth voltage, wherein the fifth voltage is a breakdown voltage of a Zener diode ZD4 of the another external voltage regulating circuit 62; the fifth voltage is not equal to the second voltage, the third voltage, and the fourth voltage, and is greater than the working voltage. The another control command could, for example, specify a predetermined physical quantity (such as a predetermined temperature). The internal control module 26 could acquire the voltage variation of the conductive rings 142, 144 through the voltage divider 52 to determine whether the voltage variation of the conductive rings 142, 144 is the second varied voltage signal or the fourth varied voltage signal. When the physical quantity sensed by the sensor 58 reaches the predetermined physical quantity, the internal control module 26 controls the another internal voltage regulating circuit 56 to generate the third varied voltage signal.

Figure 6:
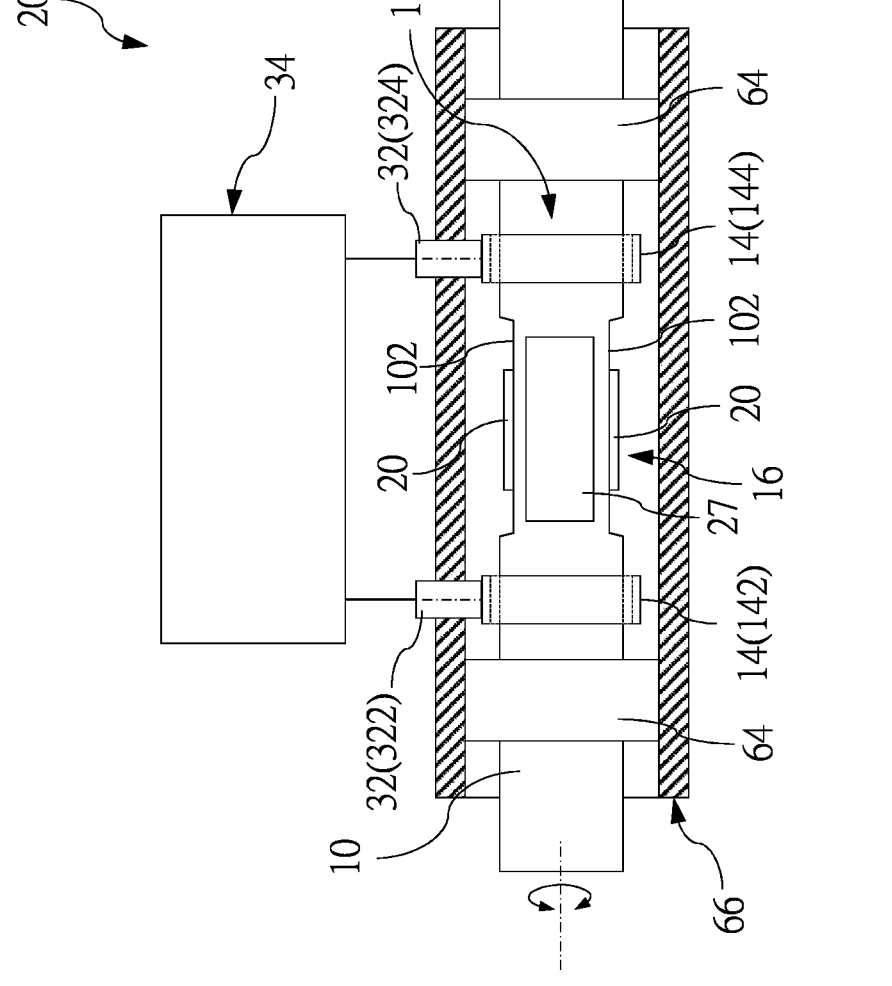
FIG. 6 is a schematic view of the torque detection assembly according to a fourth embodiment of the present invention.

A torque detection assembly 200 according to a fourth embodiment of the present invention is shown in FIG. 6, wherein a structure of the torque detection assembly 200 is based on that of the first embodiment and further includes two bearings 64 and a casing 66; the two bearings 64 are sleeved on the shaft 10; the two bearings 64 are respectively located at the outer sides of the two conductive rings 142, 144 in the axial direction of the shaft 10; outer ring faces of the two bearings 64 abut against an inner wall of the casing 66. The conductive rings 142, 144 and the internal device 16 are located in the casing 66. Each of the conductive members 322, 324 passes through the casing 66 and is in sliding contact with each of the conductive rings 142, 144. In this way, the torque sensed by the torque sensing module 18 could also be transmitted to the outside with the first varied voltage signal. The torque detection assembly 200 of the current embodiment could be applied to, for example, a bottom bracket of a bicycle; two ends of the shaft 10 are respectively connected to two cranks to detect the torque generated by the shaft 10 when a user pedals the bicycle.

In addition, the bearing 64 and the casing 66 of the current embodiment could also be applied to the second embodiment and the third embodiment.

It must be pointed out that the embodiments described above are only some preferred embodiments of the present invention. All equivalent structures which employ the concepts disclosed in this specification and the appended claims should fall within the scope of the present invention.

What is claimed is:

1. A torque detection device for detecting a torque of a shaft, comprising:

at least one conductive ring disposed at the shaft; the at least one conductive ring receiving a first power in a sliding contact manner; and an internal device disposed at the shaft and including a torque sensing module, an internal voltage regulating circuit, and an internal control module, wherein:

the torque sensing module senses the torque of the shaft and generates a corresponding electrical signal;

the internal voltage regulating circuit is electrically connected to the at least one conductive ring; the internal voltage regulating circuit is controllable to change a voltage of the first power on the at least one conductive ring;

the internal control module is electrically connected to the torque sensing module and the internal voltage regulating circuit; the internal control module determines the torque sensed by the torque sensing module based on the electrical signal; the internal control module controls the internal voltage regulating circuit to change the voltage of the first power on the at least one conductive ring based on the torque sensed by the torque sensing module to form a first varied voltage signal; wherein the first varied voltage signal varies to be a first voltage or a second voltage; the second voltage is less than the first voltage;

the internal device includes a power conversion module electrically connected to the at least one conductive ring; the power conversion module has a power output port electrically connected to the torque sensing module and the internal control module; the power conversion module converts the first power to a second power with a working voltage and outputs the second power from the power output port to the torque sensing module and the internal control module;

the working voltage is less than the second voltage of the first varied voltage signal;

the internal voltage regulating circuit includes a Zener diode and a switch element connected in series; the switch element of the internal voltage regulating circuit is electrically connected to the internal control module and is controllable to be turned on or cut off by the internal control module; when the switch element of the internal voltage regulating circuit is cut off, the first power has the first voltage; when the switch element of the internal voltage regulating circuit is turned on, the Zener diode of the internal voltage regulating circuit causes the first power to have the second voltage;

the at least one conductive ring includes two conductive rings; a cathode of the Zener diode of the internal voltage regulating circuit is connected to one of the two conductive rings; an anode of the Zener diode of the internal voltage regulating circuit is connected to a first terminal of the switch element of the internal voltage regulating circuit; a second terminal of the switch element of the internal voltage regulating circuit is connected to the other conductive ring; a third terminal of the switch element of the internal voltage regulating circuit is controllable to be turned on or cut off between the first terminal and the second terminal;

when the switch element of the internal voltage regulating circuit is turned on by the internal control module, the Zener diode of the internal voltage regulating circuit exhibits reverse breakdown, and a voltage between the two conductive rings is a breakdown voltage of the Zener diode of the internal voltage regulating circuit; the breakdown voltage constitutes the second voltage;

when the switch element of the internal voltage regulating circuit is cut off by the internal control module, the voltage between the two conductive rings is maintained at the first voltage.

2. The torque detection device as claimed in claim 1, comprising two conductive members in sliding contact with the two conductive rings, and an external device including a power supply module and an external control module; wherein the power supply module is electrically connected to the two conductive members and supplies the first power to the two conductive members; the first power is conducted to the two conductive rings through the two conductive members; the external control module is electrically connected to the two conductive members; the external control module resolves the first varied voltage signal to acquire the torque sensed by the torque sensing module.

3. The torque detection device as claimed in claim 2, wherein the external device includes a comparator circuit electrically connected to the two conductive members and the external control module; the comparator circuit respectively converts the first voltage and the second voltage to a digital high-level voltage and a digital low-level voltage suitable for the external control module.

4. The torque detection device as claimed in claim 2, wherein the external device includes a voltage divider electrically connected to the two conductive members and the external control module; the voltage divider divides the first voltage or the second voltage into a corresponding divided voltage and inputs the divided voltage to the external control module.

5. The torque detection device as claimed in claim 2, wherein the external control module determines a frequency of the first varied voltage signal; when the frequency of the first varied voltage signal matches a predetermined frequency, the external control module resolves the first varied voltage signal to acquire the torque sensed by the torque sensing module.

6. The torque detection device as claimed in claim 2, wherein the external device includes an external voltage regulating circuit electrically connected to the two conductive members and the external control module; the external voltage regulating circuit is controllable to change the voltage of the first power on the two conductive rings; the external control module controls the external voltage regulating circuit to change the voltage of the first power on the two conductive rings based on a control command to form a second varied voltage signal; the second varied voltage signal varies to be the first voltage or a third voltage, wherein the third voltage is less than the first voltage; the internal control module is electrically connected to the two conductive rings and resolves the second varied voltage signal to acquire the control command.

7. The torque detection device as claimed in claim 6, wherein the external voltage regulating circuit includes a Zener diode and a switch element connected in series; the switch element of the external voltage regulating circuit is electrically connected to the external control module and is controllable to be turned on or cut off by the external control module; when the switch element of the external voltage regulating circuit is cut off, the first power has the first voltage; when the switch element of the external voltage regulating circuit is turned on, the Zener diode of the external voltage regulating circuit causes the first power to have the third voltage.

8. The torque detection device as claimed in claim 6, wherein the internal control module determines a frequency of the second varied voltage signal; when the frequency of the second varied voltage signal matches a predetermined frequency, the internal control module resolves the second varied voltage signal to acquire the control command.

9. The torque detection device as claimed in claim 6, wherein the internal device includes a voltage divider electrically connected to the two conductive rings and the internal control module; the voltage divider divides the first voltage or the third voltage into a corresponding divided voltage and inputs the divided voltage to the internal control module.

10. A torque detection assembly, comprising:
a shaft; and
a torque detection device including at least one conductive ring and an internal device, wherein:
the at least one conductive ring is disposed at the shaft; the at least one conductive ring receives a first power in a sliding contact manner;
the internal device is disposed at the shaft and includes a torque sensing module, an internal voltage regulating circuit, and an internal control module, wherein:
the torque sensing module senses a torque of the shaft and generates a corresponding electrical signal;
the internal voltage regulating circuit is electrically connected to the at least one conductive ring; the internal voltage regulating circuit is controllable to change a voltage of the first power on the at least one conductive ring;
the internal control module is electrically connected to the torque sensing module and the internal voltage regulating circuit; the internal control module determines the torque sensed by the torque sensing module based on the electrical signal; the internal control module controls the internal voltage regulating circuit to change the voltage of the first power on the at least one conductive ring based on the torque sensed by the torque sensing module to form a first varied voltage signal; the first varied voltage signal varies to be a first voltage or a second voltage, wherein the second voltage is less than the first voltage;
the internal device includes a power conversion module electrically connected to the at least one conductive ring; the power conversion module has a power output port electrically connected to the torque sensing module and the internal control module; the power conversion module converts the first power to a second power with a working voltage and outputs the second power from the power output port to the torque sensing module and the internal control module; the working voltage is less than the second voltage of the first varied voltage signal;

the internal voltage regulating circuit includes a Zener diode and a switch element connected in series; the switch element of the internal voltage regulating circuit is electrically connected to the internal control module and is controllable to be turned on or cut off by the internal control module; when the switch element of the internal voltage regulating circuit is cut off, the first power has the first voltage; when the switch element of the internal voltage regulating circuit is turned on, the Zener diode of the internal voltage regulating circuit causes the first power to have the second voltage;

the at least one conductive ring includes two conductive rings; a cathode of the Zener diode of the internal voltage regulating circuit is connected to one of the two conductive rings; an anode of the Zener diode of the internal voltage regulating circuit is connected to a first terminal of the switch element of the internal voltage regulating circuit; a second terminal of the switch element of the internal voltage regulating circuit is connected to the other conductive ring; a third terminal of the switch element of the internal voltage regulating circuit is controllable to be turned on or cut off between the first terminal and the second terminal;

when the switch element of the internal voltage regulating circuit is turned on by the internal control module, the Zener diode of the internal voltage regulating circuit exhibits reverse breakdown, and a voltage between the two conductive rings is a breakdown voltage of the Zener diode of the internal voltage regulating circuit; the breakdown voltage constitutes the second voltage;

when the switch element of the internal voltage regulating circuit is cut off by the internal control module, the voltage between the two conductive rings is maintained at the first voltage.

11. The torque detection assembly as claimed in claim 10, comprising two conductive members in sliding contact with the two conductive rings; and
an external device including a power supply module and an external control module; wherein the power supply module is electrically connected to the two conductive members and supplies the first power to the two conductive members; the first power is conducted to the two conductive rings through the two conductive members; the external control module is electrically connected to the two conductive members; the external control module resolves the first varied voltage signal to acquire the torque sensed by the torque sensing module.

12. The torque detection assembly as claimed in claim 10, comprising two bearings, a casing, and two conductive members, wherein the two bearings are sleeved on the shaft; two outer ring faces of the two bearings abut against an inner wall of the casing; the two conductive rings and the internal device are located in the casing; the two conductive members pass through the casing and is in sliding contact with the two conductive rings.

* * * * *